May 8, 1962

J. J. REINKE ET AL 3,033,051

POWER STEERING GEAR

Filed March 5, 1959

3 Sheets-Sheet 1

INVENTORS
James J. Reinke,
John W. Gustke,
Raymond J. Schultz &
William B. Thompson BY Bryce Beeler

ATTORNEY

May 8, 1962

J. J. REINKE ET AL 3,033,051

POWER STEERING GEAR

Filed March 5, 1959

3 Sheets-Sheet 2

INVENTORS
James J. Reinke,
John W. Gustke,
Raymond J. Schultz &
William B. Thompson BY Bryce Beecher
ATTORNEY

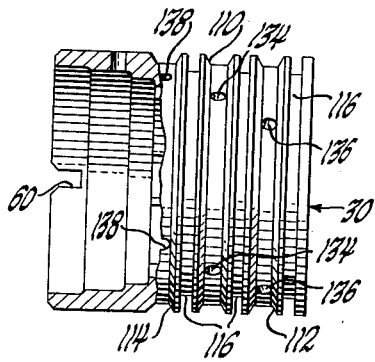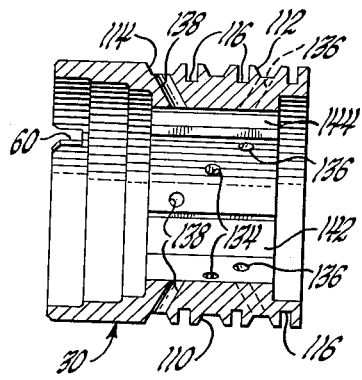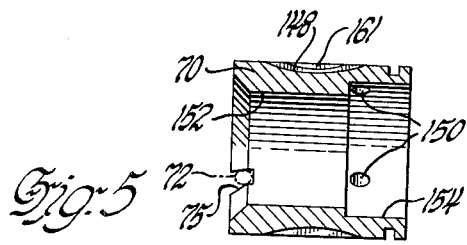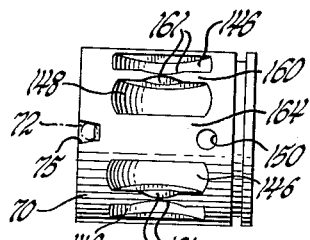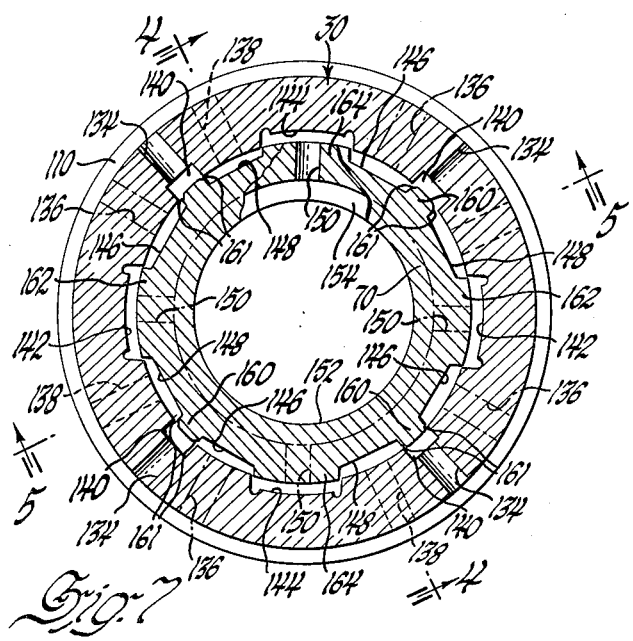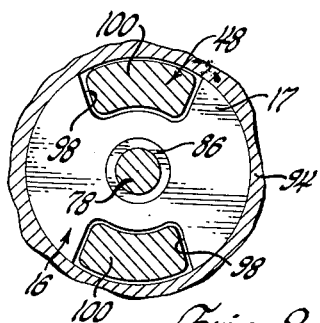

United States Patent Office 3,033,051
Patented May 8, 1962

3,033,051
POWER STEERING GEAR
James J. Reinke and John W. Gustke, Saginaw, Raymond J. Schultz, Bay City, and William B. Thompson, Saginaw, Mich., assignors to General Motors Corporation, Detroit, Mich., a corporation of Delaware
Filed Mar. 5, 1959, Ser. No. 797,526
7 Claims. (Cl. 74—388)

This invention relates to a fluid-operated servo mechanism and in its most specific aspect concerns a hydraulic power steering gear of unique construction and operation.

Due to the growing number of accessory devices demanding the use of components which, for economic and other practical reasons, must be located under the engine hood or bonnet in proximity to the engine and due further to body design trends which dictate a low silhouette with a flat hood, the space available in the engine compartment of the present-day automobile is quite restricted. This condition has led to efforts toward reducing the size and altering the shape of such components with a view toward lessening the space occupied thereby. Thus, in the instance of power steering gears, the fluid motor and control valve are now generally disposed coaxially of the steering shaft whereas in prior gears both these components were carried radially outward of the steering shaft axis.

In the case of the coaxial gears, it has been conventional to interconnect the power piston and the steering shaft via a train of balls accommodated in a helical passage formed by a worm at the end of the steering shaft and a groove complementary to the worm groove formed internally of the piston. Comprised in this arrangement is a transfer tube interconnecting the ends of the helical passage and fastened to the external wall of the piston.

The described construction presents manufacturing difficulties, is time-consuming in point of the required assembly operation and, in general, is more costly than desirable.

As suggested, the principal object of the invention is to simplify the construction just described, yet without any sacrifice in the operating efficiency of the gear.

Another object is to supply a gear which is readily manufactured to provide a varying steering ratio which has been found to be desirable.

Figure 1:
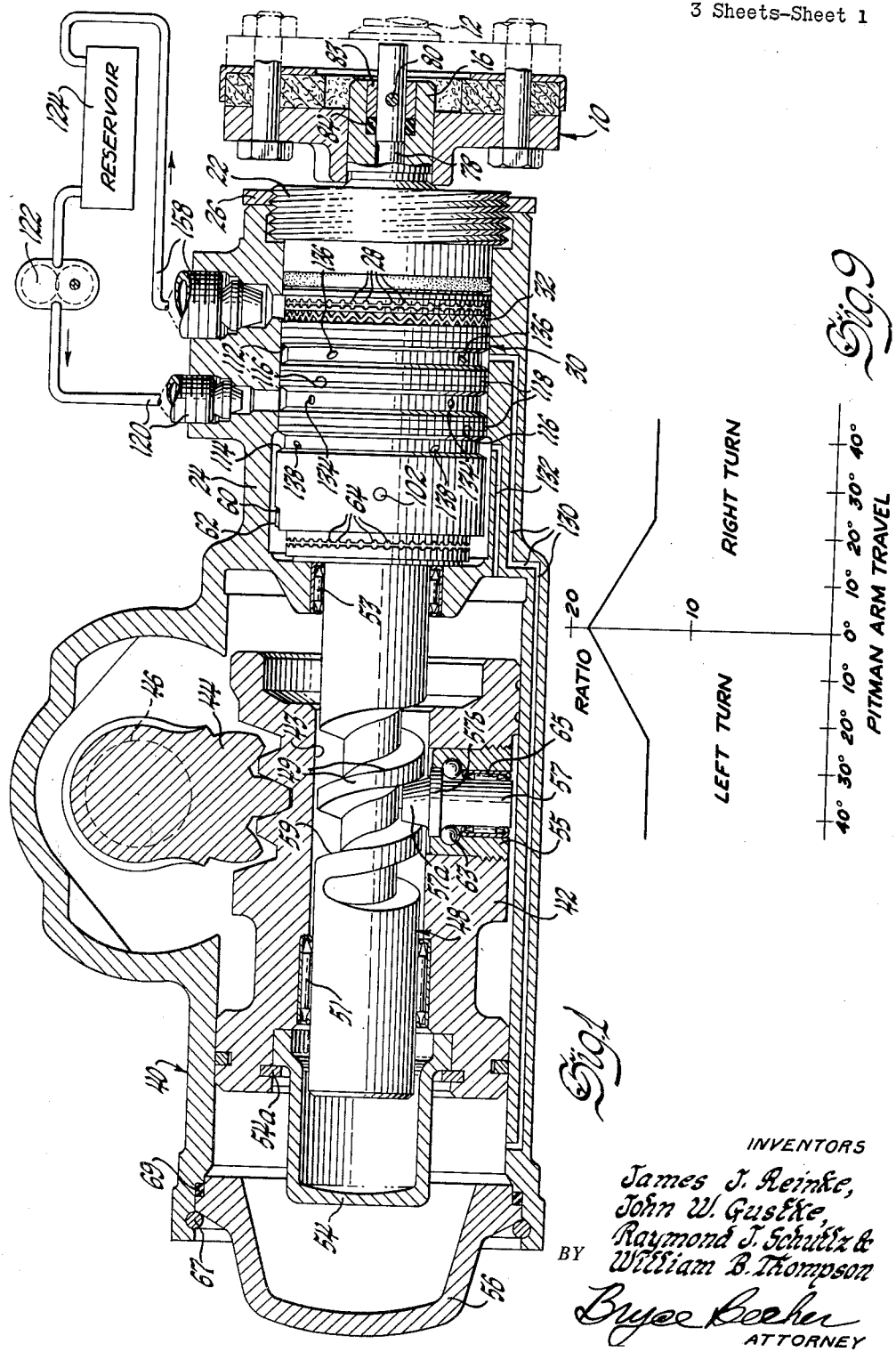
Figure 2:
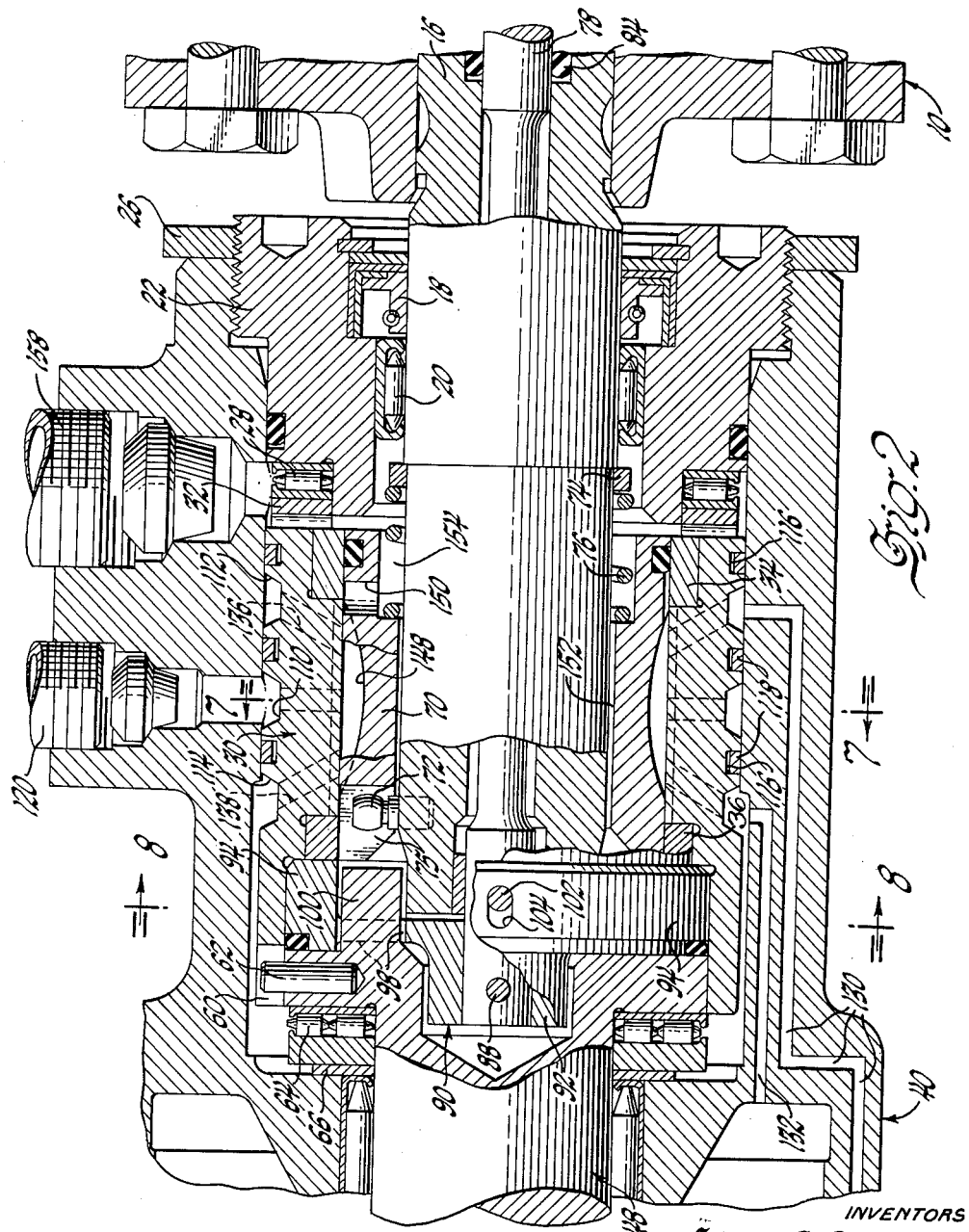

Other objects and features of the invention will be apparent from the following description of a preferred embodiment thereof. The description will proceed with reference to the accompanying drawings wherein:

FIGURE 1 is a longitudinal view, certain parts being shown in section, others in elevation;
FIGURE 2 is an enlarged fragmentary view showing the control valve preferably used on the gear;
FIGURES 3-7, inclusive, are details of the valve parts, FIGURE 4 being a section on line 4—4 in FIGURE 7, the latter figure being taken on the line 7—7 in FIGURE 2;
FIGURE 8 is a section taken on the line 8—8 in FIGURE 2; and
FIGURE 9 is a graph illustrating operating characteristics of the gear as preferably fabricated.

Generally described, the illustrated servo mechanism comprises a fluid motor having the usual output member and a control valve for the motor including a first component operably connected to the motor output member and a second component which moves in correspondence with the input to the servo. The first valve component, as indicated, turns with the motor output member and serves as a pressure pick-up, separating the pressure and return lines, also the power lines or conduits extending to the motor. The fluid travels between annular grooves in the first valve component through radial holes or passages therein to axial passages provided by complementary grooves formed in the two components and which control the direction of fluid flow.

Referring now to FIGURES 1 and 2, the numeral 10 generally denotes a flexible coupling serving to interconnecting the steering shaft 12, mounting the usual steering wheel, not shown, and a stub shaft 16 incorporated in the power steering assembly. Coupling 10 is described in U.S. Patent 2,753,848 to Robert W. Burton and, for that reason, need not be referred to here in any detail.

Stub shaft 16, which has a flanged inner end 17 (FIGURE 8), is surrounded by a fluid seal at 18 and turns in needle bearings 20 inward of the seal. Both the seal and needle bearings are confined by an adjuster plug 22 threaded into the end of the housing 24 for the control valve component of the power steering apparatus. A lock nut 26 secures the adjuster plug in place. At its inner end the plug is annularly recessed for the accommodation of thrust bearings 28, these bearings being functional with relation to an outer sleeve component 30 of the control valve. A spacer 32 will be seen disposed between the upper or righthand face of the sleeve 30 and the bearing race. At such end, sleeve 30 is internally annularly recessed to receive a ring element 34. A similar ring element 36 is accommodated in an annular recess at the opposite end of the sleeve. These ring elements serve to close off the ends of axial passages in the valve body, as will be subsequently understood.

A fluid motor or power cylinder 40 integral with the valve housing 24 confines a piston 42 having rack teeth meshing with the teeth of a gear sector 44 fixed to or integral with a cross shaft 46. The latter connects with a pitman arm, not shown, through which the steering linkage is actuated.

Piston 42 has an axial bore 43 for the accommodation of a shaft 48 turning in needle bearings 51, 53 and having a cam portion 49. A cap piece 54 will be seen as closing the end of the axial bore 43, such piece being held in place by a snap ring 54a seating in an annular groove formed in piston 42. Another cap piece 56 leftward of the cap piece 54 serves to close the left end of the cylinder 40, being held in place by a snap ring 67 and being surrounded by a seal 69.

In addition to the axial bore, piston 42 is formed with a radial bore which is threaded for the reception of a plug 55 surrounding a follower 57. This follower has a frusto-conical head 57a accommodated in the helical cam groove 59. Below the frusto-conical head is a flange 57b functional with relation to ball bearings 63 which in operation of the gear course an annular groove formed interiorly of the plug 55. Below the balls 63 the shank portion of the follower will be noted as surrounded by needle bearings 65.

Reverting to the outer sleeve component 30 of the control valve, it should be noted that the same is slotted at 60 to accommodate a pin 62 staked in the flanged end of the shaft 48. Such end of the shaft will be seen as abutting a thrust bearing assembly 64. Leftward of such assembly is a Belleville spring 66 coacting with the adjuster plug 22 to preload the bearings 28 and 64.

Within the body or outer sleeve component 30 of the control valve is confined a sleeve 70 secured by means of a pin 72 to the previously mentioned stub shaft 16. This shaft is formed to provide a shoulder for a snap ring 74 seating a damping spring 76 which, at its opposite end, seats against a shoulder provided by the inner sleeve 70.

Stub shaft 16 has a central bore for the accommodation of a torsion rod 78 which is pinned to the stub shaft at 80 through an annulus 83 confining a seal 84. At its end opposite the pin 80, torsion rod 78 is surrounded by bearings 86 and is pinned at 88 to a connector 90 including a boss portion 92 and a flange portion 94. This flange portion is apertured at 96 and 98 to allow for the passage therethrough of tangs 100 integral with the cam shaft 48. These tangs are received with a slight clearance in slots formed in the flanged end 17 of the stub shaft 16 (FIGURE 8).

A pin 102 staked in the outer sleeve component 30 of the control valve will be seen accommodated (FIGURE 2) in a slot 104 in the flange portion 94 of the connector 90.

With the arrangement as so far described and illustrated, it should be clear, considering the pin connections, that on imposition of manual turning effort at the steering wheel, all of the parts 16, 70, 78, 90, 48 and 30 tend to rotate with the steering wheel, once the clearance is taken up between tangs 100 and the walls of the slots in stub shaft 16.

The general organization of the gear having been thus explained, reference will now be made to FIGS. 3–6 showing control valve components in detail. From FIGS. 3 and 4 it will be seen that the outer sleeve component 30 comprises three annular grooves 110, 112 and 114, spaced by grooves 116 in which are seated seals 118 (FIGS. 1 and 3). These seals 118 serve to separate the passages provided by the annular grooves. Groove 110 may be termed the "pressure" groove as the same is open to the discharge line 120 (FIG. 1) of the power steering pump 122 which draws fluid from a reservoir 124. Annular grooves 112 and 114 may be termed "power" grooves since these grooves are open via lines 130 and 132 respectively to the lower and upper ends of the power cylinder 40.

Each groove 110, 112 and 114 has therein a plurality of radial ports 134, 136 and 138 respectively. In the case of the particular embodiment, four radial ports in each groove are contemplated. From FIG. 7, it will be observed that radial ports 134 are drilled straight, while from FIG. 4, it will be seen that radial ports 136 and 138 are drilled diagonally so that their axes intersect.

In addition to the annular grooves and radial ports, the outer sleeve 30 comprises internal axial grooves 140, 142 and 144 (FIGURE 7).

Axial grooves 140, 142 and 144 are coactive with respect to axial grooves 146 and 148 in the inner sleeve component 70, which will now be discussed. As viewed in FIGURE 5, the latter grooves will be noted as arcuately shaped, this to the end of providing for fluid sealing at the ends of the sleeve 70.

Like the outer sleeve 30, sleeve 70 has therein a plurality of radial ports 150. These ports open to the bore 152 of the sleeve which in turn, as shown in FIGURE 1, opens to a chamber 154 within which the damping spring 76 is housed. Chamber 154 communicates via the spacer 32 to an exhaust line 158 extending to the system reservoir 124.

The axial grooving of the sleeve 70 provides a plurality of lands 160, 162 and 164. Lands 162 and 164 contain the radial exhaust ports 150. The inner edges of lands 160, as these appear in FIGURE 6, are chamfered for a reason which will be subsequently understood.

Operation

Torsion rod 78, unlike the coil springs employed in conventional power steering gears, is under no preload and, consequently, immediately begins to twist on the imposition of the steering effort. Such twisting results in rotary movement of the inner sleeve 70 relative to the outer sleeve 30, the relative motion being permitted by the clearance between the tangs 100 and the walls of the slots in the stub shaft flange 17, causing energization of the motor 40, 42.

With the sleeve 70 centered in the sleeve 30 (FIGURE 7) as obtains when the dirigible wheels of the vehicle are in straight-ahead position, radial ports 134, which are disposed in the annular pressure grooves 110, are open both to the radial ports 136 and 138 and the radial exhaust ports 150. Thus, under this condition, the pressure fluid provided by the pump 122, which should be considered as in constant operation so long as the vehicle engine is running, freely circulates through the valve against the static pressure of the fluid in the power cylinder 40.

Assuming a right turn, for example, the clockwise rotation of the sleeve 70 will cause lands 160 to seal off radial ports 138 from radial ports 134 so that the flow of pressure fluid is limited to radial ports 136 which communicate via passage 130 with the lower end of power cylinder 40. Simultaneously, lands 162 close off radial ports 136 to the related exhaust ports 150, and, in consequence, a pressure differential is created across the piston 42 in favor of the lower or lefthand chamber of the power cylinder and the desired fluid assist given to the piston. With the sleeve 70 in its rotated position (clockwise) radial ports 138 are fully open to the corresponding radial exhaust ports 150 so that the upper or righthand chamber of the power cylinder is free to exhaust.

On a left-turn the action, of course, is just the opposite, the radial exhaust ports 150 functional with relation to the ports 138 being closed off while ports 136 remain open to the exhaust line.

The outer sleeve 30 being connected to the worm 48 to rotate therewith seeks constantly to catch up, so to speak, with the inner sleeve. As a result, cessation of the effort at the steering wheel is marked by immediate centering of the sleeves with no retardation of the forces bringing about reversal of the steering parts.

The degree of twisting or deflection of the torsion rod 78 as the steering action proceeds is determined by the load (steering resistance) and is essentially a straight line function. Thus, substantially twice as much effort is required at the steering wheel to twist the rod two degrees as must be imposed to twist it one degree. The actual rate of the rod, of course, is set by control of the diameter and/or length thereof. In a preferred form of the invention, a rate of the order of 9 inch-pounds per degree of deflection obtains.

Referring now to the matter of the chamfering 161 of the lands 160 carried by the inner sleeve component 70 of the rotary control valve, it should be clear on reflection that in the absence of such chamfers, once the valving edge of the land cleared the edge of the corresponding port, the pressure build-up in the fluid motor would be substantially instantaneous regardless of the steering resistance. Such a condition would not be desirable because there would be no proportionality of "feel" at the steering wheel; i.e., the "feel" at the steering wheel would bear no relation to the actual steering resistance.

By means of the chamfering, a "wire drawing" effect is created with the result that the opening and closing of the pressure ports 134 is smooth and progressive. In the case of the above-mentioned preferred embodiment of the invention, the pressure build-up occurs through a 1°–3° deflection of the torsion rod. Thus, during parking or maneuvering of the vehicle in close quarters when maximum pressure is required to energize the fluid motor, the effort required at the steering wheel to maintain the inner sleeve component of the valve displaced is substantially three times that required to hold the sleeve displaced where the steering resistance is slight as, for example, when the vehicle is being driven over a highway at normal cruising speeds. In this way the operator is provided with proportional "feel" as desired.

In lieu of the chamfering, the wire drawing effect can, of course, be obtained by suitably formed notches, for instance, appropriately spaced about the valving edge of the lands controlling the inlet or pressure ports. Lands 162 and 164 controlling the exhaust porting may also be chamfered or provided with notches, for example, if considered desirable.

As is undoubtedly clear by now, the manual effort applied to cam shaft 48 through the valve parts induces rotation of the shaft with axial movement of piston 42, the translation being effected by follower 57. In the illustrated construction, and as preferred, the helical cam groove 49 is of non-uniform lead thereby to provide a decreasing mechanical advantage as the follower and cam groove become mutually displaced from their centered positions shown—corresponding to the straight-ahead position of the dirigible wheels of the vehicle. For results generally considered optimum, the cam groove is formed or generated as illustrated by FIGURE 9 wherein the vertical line shows the changing steering ratio and the horizontal line the angular displacements of the pitman arm.

As a result of the non-uniformity in the lead of the cam groove, the sensitivity of the steering gear is near ideal under straight-ahead highway conditions, while during parking and maneuvering in close quarters, the necessary angular displacements of the dirigible wheels can be effected without excessive turning of the steering wheel.

What is claimed is:

1. In a steering gear comprising a source of fluid pressure, a fluid motor including a cylinder having a piston therewithin, a shaft extending from said cylinder with which said piston operably connects, and a valve controlling fluid flow between said source and said motor including first and second members, said first member being movable relative to said second member from a normal neutral position to vary the fluid flow, the combination of a manually manipulated member operably connected to said first member to move the same, a cam member extending into an axial bore in said piston, a deformable member interconnecting said cam member and said manually manipulatable member, movement of said first member relative to said second member being marked by deformation of said deformable member, the latter tending to maintain said first member in its said normal neutral position, and a follower carried by said piston to operably connect the same with said cam member, said cam member being formed to provide a varying steering ratio whereby more turns of said manually manipulated member are required to bring about powered movement of said piston through the center areas of engagement of said cam member and said follower than are required in the other areas of engagement of such parts.

2. In a steering gear comprising a source of fluid pressure, a fluid motor including a cylinder having a piston therewithin provided with rack teeth, a cross shaft extending from said cylinder and carrying a sector gear within the cylinder meshing with said rack teeth, and a valve controlling fluid flow between said source and said motor including first and second members, said first member being movable relative to said second member from a normal neutral position to vary the fluid flow, the combination of a manually manipulatable member operably connected to said first member to move the same, a cam member connected to said second member and extending into an axial bore in said piston, a deformable member interconnecting said cam member and said manually manipulatable member, said deformable member deforming incident to movement of said first member relative to said second member, and a follower carried by said piston to operably connect the same with said cam member, said cam member being formed to provide a varying steering ratio whereby more turns of said manually manipulated member are required to bring about powered movement of said piston through the center areas of engagement of said cam member and said follower than are required in the other areas of engagement of such parts.

3. In a steering gear comprising a source of fluid pressure, a fluid motor including a cylinder having a piston therewithin provided with rack teeth, a cross shaft extending from said cylinder and carrying a sector gear within the cylinder meshing with said rack teeth, and a valve controlling fluid flow between said source and said motor including first and second members, said first member being rotatable relative to said second member from a normal neutral position to vary the fluid flow, the combination of a manually rotatable shaft operably connected to said first member to rotate the same, a second shaft connected to said second member and having a cam portion extending into an axial bore in said piston, a deformable member interconnecting said second shaft and said manually rotatable shaft, said deformable member deforming incident to movement of said first member relative to said second member, and a follower for said cam portion rotatably carried by said piston and having a centered position relative to said cam portion corresponding to the said normal neutral position of said first member, said cam portion being formed to provide a varying steering ratio whereby more turns of said manually rotatable shaft are required to bring about powered movement of said piston through the center areas of engagement of said cam portion and said follower than are required in the other areas of engagement of such parts.

4. In a steering gear assembly comprising a steered element, a source of fluid pressure, a fluid motor including a cylinder having a piston therewithin provided with rack teeth, a cross shaft extending from said cylinder and carrying a sector gear within the cylinder meshing with said rack teeth, the teeth of said sector gear and said rack teeth having a centered position corresponding to the neutral position of said steered element and a valve controlling fluid flow between said source and said motor including first and second members, said first member being movable relative to said second member from a neutral position to vary the fluid flow, the combination of a manually manipulatable member operably connected to said first member to move the same, a cam member connected to said second member and extending into an axial bore in said piston, a deformable member interconnecting said cam member and said manually manipulatable member, said deformable member deforming incident to movement of said first member relative to said second member, and a follower for said cam member carried by said piston and having a centered position relative to said cam member corresponding to the centered position of said gear sector teeth and said rack teeth, said assembly being further distinguished in that said cam member is formed to provide a varying steering ratio whereby greater movement of said manually manipulatable member is required to bring about powdered movement of said steered element through the center areas of engagement of said cam member and said follower than is required through the off-center areas of engagement of such parts.

5. In a steering gear comprising a source of fluid pressure, a fluid motor including a cylinder having a piston therewithin provided with rack teeth, a cross member extending from said cylinder and carrying a sector gear within the cylinder meshing with said rack teeth, and a valve controlling fluid flow between said source and said motor including first and second members, said first member being rotatable relative to said second member from a normal neutral position to vary the fluid flow, the combination of a manually rotatable shaft operably connected to said first member to rotate the same, a second shaft connected to said second member and having a cam portion extending into an axial bore in said piston, a lost motion connection between said shafts, a torsion bar interconnecting said shafts and deforming incident to movement of said first member relative to said second member within the limits set by said lost motion connection, and a follower for said cam portion rotatably carried by said piston and having a centered position relative to said cam portion corresponding to the said normal neutral position of said first member, said cam portion being formed to provide a varying steering ratio whereby more turns of said manual rotatable shaft are required to bring about powered movement of said piston through the near-center areas of engagement of said cam portion and said follower than are required in the other areas of engagement of such parts.

6. In a steering gear assembly comprising a steered element, a source of fluid pressure, a fluid motor including a cylinder having a piston therewithin provided with rack teeth, a cross member extending from said cylinder and carrying a sector gear within the cylinder meshing with said rack teeth, the teeth of said sector gear and said rack teeth having a centered position corresponding to the neutral position of said steered element, and a valve controlling fluid flow between said source and said motor including first and second members, said first member being rotatable relative to said second member from a normal neutral position to vary the fluid flow, the combination of a manually rotatable shaft operably connected to said first member to rotate the same, a second shaft connected to said second member and having a cam portion extending into an axial bore in said piston, said cam taking the form of a helical groove, a lost motion connection between said shafts, a torsion bar interconnecting said shafts and deforming incident to movement of said first member relative to said second member within the limits set by said lost motion connection, and a follower for said cam portion rotatably carried by said piston with its axis normal to that of said cam portion and having a centered position in said helical groove corresponding to the centered position of said gear teeth and said rack teeth, said assembly being further distinguished in that the lead of said helical groove is made non-uniform to provide a varying steering ratio whereby progressively fewer turns of said manually rotatable member are required to bring about powered movement of said steered element as said follower becomes displaced in either direction from its centered position in said groove.

7. An assembly according to claim 6 where said follower has a frusto-conical head accommodated in said groove and has associated therewith anti-friction elements facilitating rotation thereof in the operation of the assembly.

References Cited in the file of this patent

UNITED STATES PATENTS

| | | |
|---|---|---|
| 1,567,997 | Ross | Dec. 29, 1925 |
| 2,464,110 | Wright | Mar. 8, 1949 |
| 2,828,721 | Folkerts | Apr. 1, 1958 |
| 2,865,218 | Bishop | Dec. 23, 1958 |

OTHER REFERENCES

S.A.E. Journal, March 1958 (copy in Div. 12), page 157.